US012330417B2

(12) United States Patent
Tse et al.

(10) Patent No.: US 12,330,417 B2
(45) Date of Patent: *Jun. 17, 2025

(54) PRINTER WITH GAS EXTRACTION OF PRINTING FLUID FROM PRINTING NOZZLE

(71) Applicant: The Regents of the University of Michigan, Ann Arbor, MI (US)

(72) Inventors: Lai Yu Leo Tse, Ann Arbor, MI (US); Ethan John McMillan, Grand Haven, MI (US); Kira Barton, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 139 days.

This patent is subject to a terminal disclaimer.

(21) Appl. No.: 18/086,905

(22) Filed: Dec. 22, 2022

(65) Prior Publication Data

US 2023/0122430 A1 Apr. 20, 2023

Related U.S. Application Data

(63) Continuation of application No. 16/901,556, filed on Jun. 15, 2020, now Pat. No. 11,548,277.

(Continued)

(51) Int. Cl.

*B41J 2/06* (2006.01)
*B05B 5/025* (2006.01)

(Continued)

(52) U.S. Cl.

CPC ............... *B41J 2/06* (2013.01); *B05B 5/0255* (2013.01); *B41J 2/175* (2013.01); *B41J 2/04576* (2013.01);

(Continued)

(58) Field of Classification Search

CPC .................................................... B41J 2202/02

See application file for complete search history.

(56) References Cited

U.S. PATENT DOCUMENTS 3,698,635 A 10/1972 Sickles
4,839,666 A 6/1989 Jayne (Continued)

FOREIGN PATENT DOCUMENTS

EP 0145131 A2 6/1985
EP 2881259 A1 6/2015

(Continued)

OTHER PUBLICATIONS

Japanese Office Action corresponding to Japanese application 2022-501308, dated Mar. 7, 2023, 11 pages.

(Continued)

*Primary Examiner* — Shelby L Fidler

(74) *Attorney, Agent, or Firm* — Reising Ethington P.C.

(57) ABSTRACT

A printer is configured to provide a stream of extraction gas that extracts a printing fluid from a printing nozzle. An electrode produces an electric field that accelerates the extracted printing fluid toward a printing substrate. The printer can be configured to selectively turn the electric field and the stream of extraction gas off and on to enable printing in a gas-extraction mode, an e-assisted gas-extraction mode, or an e-jet mode. The stream of gas can be provided by a second nozzle concentric with the printing nozzle, and the electrode can be part of the second nozzle. A third nozzle can discharge a focusing gas around the extracted printing fluid.

19 Claims, 2 Drawing Sheets

Related U.S. Application Data

(60) Provisional application No. 62/873,033, filed on Jul. 11, 2019.

(51) Int. Cl.

| | |
|---|---|
| ***B41J 2/175*** | (2006.01) |
| ***B41J 2/45*** | (2006.01) |
| *B41J 2/045* | (2006.01) |

(52) U.S. Cl.

CPC ........ *B41J 2/04581* (2013.01); *B41J 2202/02* (2013.01); *B41J 2202/04* (2013.01); *B41J 2202/15* (2013.01)

(56) References Cited

U.S. PATENT DOCUMENTS

| | | | |
|---|---|---|---|
| 5,456,414 A | 10/1995 | Burns et al. | |
| 6,065,825 A | 5/2000 | Anagnostopoulos et al. | |
| 7,216,958 B2 | 5/2007 | Lee et al. | |
| 9,415,590 B2 | 8/2016 | Barton et al. | |
| 11,548,277 B2 * | 1/2023 | Tse | B41J 2/06 |
| 2006/0092239 A1 | 5/2006 | Sung et al. | |
| 2009/0135228 A1 | 5/2009 | Lee et al. | |
| 2010/0163647 A1 | 7/2010 | Wurz | |
| 2014/0253638 A1 | 9/2014 | Kim | |
| 2014/0322451 A1 | 10/2014 | Barton et al. | |

FOREIGN PATENT DOCUMENTS

| | | | |
|---|---|---|---|
| JP | S56130366 A | 10/1981 | |
| JP | S57182448 A | 11/1982 | |
| JP | 58078775 A * | 5/1983 | B41J 2/06 |
| JP | S6135257 A | 2/1986 | |
| KR | 10-2009-0055200 A | 6/2009 | |
| KR | 101275225 B1 | 6/2013 | |
| KR | 10-2014-0039590 A | 4/2014 | |
| WO | 2009/060898 A1 | 5/2009 | |

OTHER PUBLICATIONS

European Search Report corresponding to European application 20836177, dated Jun. 15, 2023, 8 pages.
International Search Report corresponding to International Application No. PCT/US2020037758, dated Sep. 25, 2020, 3 pages.
Written Opinion corresponding to International Application No. PCT/US2020037758, dated Sep. 25, 2020, 7 pages.
Japanese Office Action in corresponding Japanese application 2022-501308, dated Sep. 12, 2023, 10 pages (4 pages office action, 6 pages translation).
English Translation of Korean Office Action in corresponding Korean application 10-2022-7004501, dated Nov. 24, 2023, 6 pages.
Korean Office Action in corresponding Korean application 2022-501308, dated Sep. 24, 2024, 6 pages (3 pages office action, 3 pages translation).
European Office Action corresponding to application 20836177.4, dated Nov. 7, 2024, 6 pages.

* cited by examiner

PRINTER WITH GAS EXTRACTION OF PRINTING FLUID FROM PRINTING NOZZLE

TECHNICAL FIELD

The present disclosure relates generally to printing and is particularly applicable to the printing of specialty printing fluids.

BACKGROUND

Printing has evolved from a technique for producing readable text and graphic images, primarily for informational purposes, to a useful manufacturing process with a promising future. In particular, the ability to deposit a functional material onto a printing medium only at particularly specified locations can lead to a zero-waste and relatively fast additive manufacturing process when adapted to deposit materials other than traditional pigments or dyes. But difficulties with the deposition of materials having useful properties other than visual contrast with the printing medium continues to limit printing as a manufacturing process. This is partly because applicable printing technologies generally deliver liquid-based materials to or toward the printing medium, while manufactured goods are typically formed from solid materials. While some solid materials can be printed in particulate form via a liquid carrier material that subsequently evaporates, reacts, or acts as a binder, there are limitations on solids content and particle size for compatibility with known printing methods.

SUMMARY

Embodiments of a printer include a print head having a printing nozzle, an extraction gas nozzle, and an electrode. The printer is configured to selectively generate an electric field between the electrode and a substrate and to selectively discharge an extraction gas from the extraction gas nozzle such that the extraction gas flows along a tip of the printing nozzle. The printer is operable to deposit printing fluid extracted from the printing nozzle onto the substrate in a gas-extraction mode, an e-jet mode, and an e-assisted mode. In the gas-extraction mode, no voltage is supplied to the electrode so that the electric field is not generated, and the extraction gas is pressurized in the extraction gas nozzle and discharged from the extraction gas nozzle to extract the printing fluid from the printing nozzle. In the e-jet mode, the extraction gas is not discharged from the extraction gas nozzle and a voltage is supplied to the electrode so that the electric field is generated to extract the printing fluid from the printing nozzle. In the e-assisted mode, the extraction gas is pressurized in the extraction gas nozzle and discharged from the extraction gas nozzle and a voltage is supplied to the electrode so that the electric field is generated and the printing fluid is extracted from the printing nozzle.

In various embodiments, the electrode circumscribes the printing nozzle.

In various embodiments, the extraction gas nozzle comprises the electrode.

In various embodiments, the extraction gas nozzle is coaxial with the printing nozzle.

In various embodiments, the extraction gas flows along a gap between the printing nozzle and the extraction gas nozzle before flowing along the tip of the printing nozzle in the gas-extraction mode and the e-assisted mode.

In various embodiments, the extraction gas nozzle circumscribes the printing nozzle such that the extraction gas flows along an annular gap at an outer surface of the printing nozzle before being discharged from the extraction gas nozzle and converging at the tip of the printing nozzle in the gas-extraction mode and the e-assisted mode.

In various embodiments, the tip of the printing nozzle is outside of the extraction gas nozzle.

In various embodiments, the printer is changeable between the gas-extraction mode and the e-assisted mode by switching an electrode voltage respectively off and on.

In various embodiments, the tip of the printing nozzle is located between the extraction gas nozzle and the substrate.

In various embodiments, the printer includes a focusing nozzle that is coaxial with and surrounds the extraction gas nozzle such that a focusing gas flows along an annular gap at an outer surface of the extraction gas nozzle before being discharged from the focusing nozzle to provide a shroud of focusing gas around the extracted printing fluid between the printing nozzle and the substrate.

Embodiments of a printer a printing nozzle an extraction gas nozzle. The printing nozzle has a tip and is configured to supply an uncharged printing fluid in bulk liquid form at the tip for extraction from the nozzle by an extraction gas. The extraction gas nozzle is configured to discharge a stream of the extraction gas toward a substrate with the tip of the nozzle in the stream of extraction gas. A velocity of the extraction gas is sufficient to continuously extract the printing fluid from the printing nozzle and carry the extracted printing fluid to the substrate.

In various embodiments, the printer includes an electrode configured to provide an electric field between the electrode and the substrate such that the printing fluid accelerates toward the substrate after extraction from the printing nozzle.

In various embodiments, the electrode circumscribes the printing nozzle, and the extraction gas nozzle may include the electrode.

In various embodiments, the printing fluid is pressurized in the printing nozzle and the printing fluid has a composition that prevents the printing fluid from being forced out of the tip of the nozzle in the absence of the stream of extraction gas.

In various embodiments, the tip of the printing nozzle is located between the extraction gas nozzle and the printing substrate.

In various embodiments, the printer includes a focusing nozzle configured to provide a shroud of focusing gas around the extracted printing fluid between the printing nozzle and the substrate.

Embodiments of a printer include a print head having a printing nozzle, an extraction gas nozzle, and an electrode. The printing nozzle has a tip and is configured to supply a printing fluid at the tip for extraction from the printing nozzle. The extraction gas nozzle includes a gas discharge port configured to discharge a stream of extraction gas along an outer surface of the printing nozzle and toward a substrate. The tip of the printing nozzle is axially spaced from the gas discharge port and located in the stream of extraction gas between the gas discharge port and the substrate. A velocity of the extraction gas is sufficient to continuously extract printing fluid from the printing nozzle and carry the extracted printing fluid to the substrate. The electrode is configured to provide an electric field between the electrode and the substrate with the tip of the printing nozzle in the electric field such that the printing fluid accelerates toward the substrate after extraction from the printing nozzle.

In various embodiments, the electrode circumscribes the printing nozzle.

In various embodiments, the extraction gas nozzle includes the electrode.

It is contemplated that any number of the individual features of the above-described embodiments and of any other embodiments depicted in the drawings or description below can be combined in any combination to define an invention, except where features are incompatible.

DESCRIPTION OF EMBODIMENTS

Described below is an aerosol printing system and method capable of controllably depositing specialty fluids such as high viscosity liquids, fluids comprising large solid particles, and functional inks onto or over a surface, including contoured surfaces. Conventional aerosol printers operate by first atomizing a printing fluid and then mixing the atomized fluid with air and discharging the resulting aerosol under pressure through a nozzle. However, this technique is only compatible with printing fluids having a viscosity of less than about 500 centipoise and a maximum particle size of about 1 micron or less. As discussed further below, the system can be equipped with a high voltage electrode to help focus the aerosol or to accommodate electrohydrodynamic printing.

As used herein, a functional ink is a printing fluid that provides a function other than coloration once solidified on the surface on which it is printed. Examples of such functions include electrical conductivity, dielectric properties, physical structure (e.g., stiffness, elasticity, or abrasion resistance), electromagnetic shielding or filtering, optical properties, electroluminescence, etc. A printing fluid is any fluid that flows under pressure and can be solidified after deposition. Solidification can be via various mechanisms, such as solvent evaporation, chemical reaction, cooling, or sintering.

Figure 1:
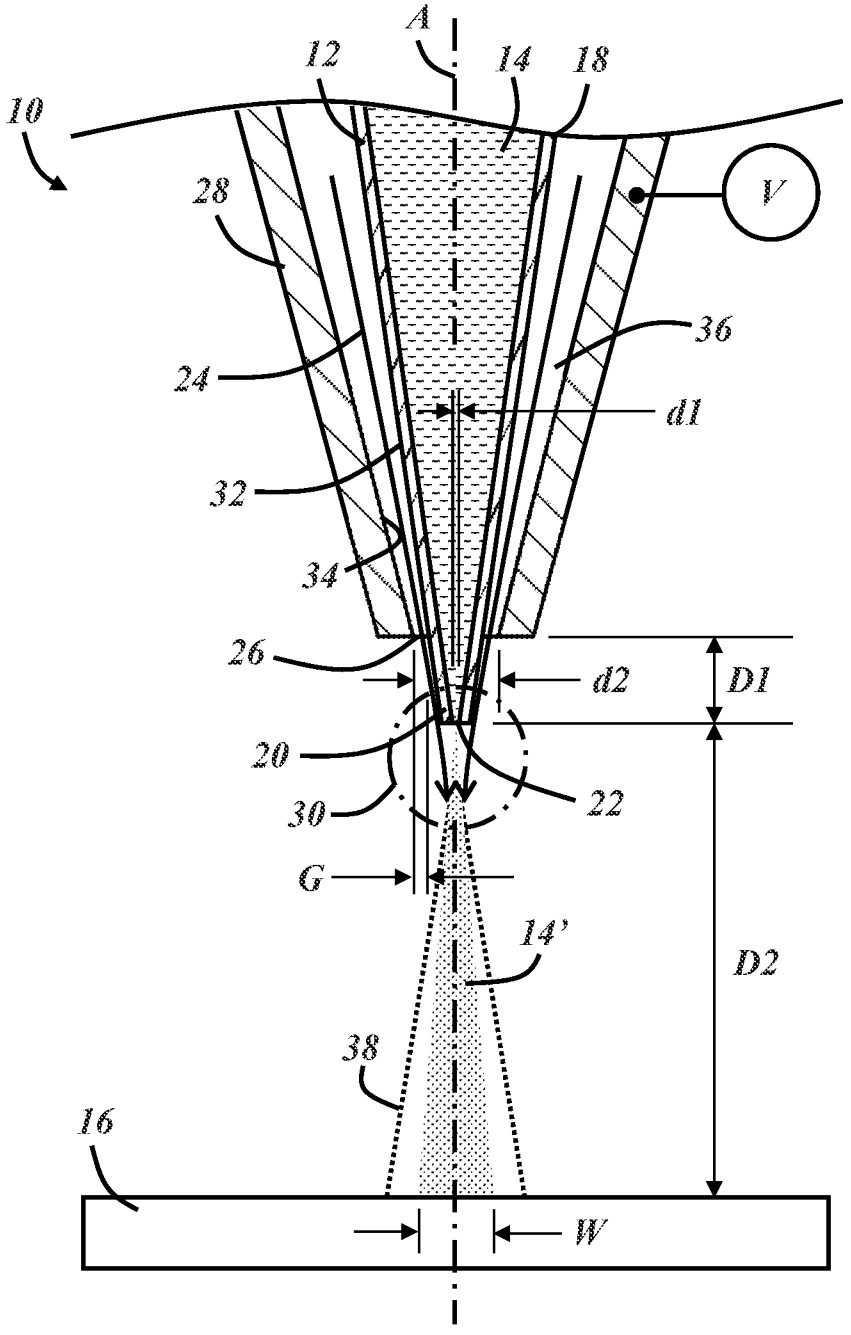
FIG. 1 is cross-sectional view of a portion of a printer that uses a flowing gas to extract printing fluid from a nozzle.

FIG. 1 is a cross-sectional view of a portion of an illustrative print head 10 that includes a printing nozzle 12 that contains a printing fluid 14 for controlled deposition on a printing substrate 16 along a desired printing path. The print head 10 is one component of a printer or printing system, the other components of which are not illustrated but may include a power supply, a printing fluid source, a mechanism for moving and/or changing the orientation of the print head and/or the substrate 16 relative to one another, and a control system configured to control the movement mechanism and/or other printing parameters, such as various pressures, temperatures, voltages as a function of time or print head position or orientation, for example. The printer can print directly onto a surface of the substrate 16 or onto a previously printed material, which effectively becomes the printing substrate.

The nozzle 12 extends along an axis (A) from a supply end 18 that is in fluidic communication with a source of the printing fluid 14 to a tip 20. The nozzle 12 is configured to supply the printing fluid 14 at the tip 20 for extraction from the nozzle and subsequent deposition on the substrate 16. Printing fluid extraction occurs through an orifice 22 at the tip 20 of the nozzle 12. The orifice 22 may have a width or diameter (d1) in a range from 50 μm to 250 μm or from 80 μm to 200 μm, and the nozzle 12 may have a wall thickness in a range from 10 μm to 75 μm.

Extraction of the printing fluid 14 from the nozzle 12 is achieved by providing a stream or jet of an extraction gas 24 external to the nozzle 12 with the nozzle tip 20 positioned in the stream of gas. In the illustrated example, the stream of extraction gas 24 is discharged from a gas discharge port 26 at the end of an extraction gas nozzle 28 and toward the printing substrate 16. The extraction gas 24 is discharged with a velocity sufficient to continuously draw or extract the printing fluid 14 from the nozzle 12 and then carries the extracted printing fluid 14' to the printing substrate 16. The extraction gas 24 can be air, nitrogen, a noble gas, or any other suitable gas.

The high velocity stream of extraction gas 24 produces a low-pressure region 30 at and in front of the nozzle tip 20 and thereby provides a pressure differential that causes the printing fluid 14 to be extracted from the nozzle 12. The printer therefore does not rely only on backpressure on the printing fluid 14 for the pressure differential. This allows the printing of fluids having a high viscosity or fluids comprising large solid particles. For instance, fluids having a viscosity in a range from 100 to 500,000 centipoise (cps) can be printed using this extraction technique, particularly when combined with a pressurized printing fluid in the nozzle. Similarly, printing fluids containing solid particles having an effective diameter from 5 μm to 200 μm can be printed. This far exceeds the capabilities of conventional aerosol printing. These values are non-limiting, and printing fluids with lower viscosities and smaller particle sizes can be printed with this technique.

In some cases, the printing fluid 14 is pressurized in the nozzle 12 at a pressure in a range from 15 psi to 90 psi, but the printing fluid has a composition that effectively prevents the fluid from being forced through the orifice 22 in the absence of the stream of extraction gas 24 or other external influences. Use of the extraction gas 24 permits printing of such a material without increasing the size of the orifice 22, which would decrease the resolution of the printer.

One example of a useful printing application is deposition of electrical interconnects of an electronics circuit onto a surface, which is conventionally performed by screen printing using a conductive ink. Conductive inks that, once solidified, have sufficient electrical conductivity to function as low resistance electrical connections have such a high solids content that they are incompatible with most printing technologies. The illustrated print head 10 does not require a unique mask for every different pattern of electrical interconnects it can print. Moreover, the illustrated print head can print on contoured surfaces, while screen printing is limited to generally flat surfaces.

In the embodiment of FIG. 1, the extraction gas nozzle 28 is coaxial with and surrounds the printing nozzle 12. An outer surface 32 of the printing nozzle 12 and an inner surface 34 of the extraction gas nozzle are spaced apart to define an annular gap 36 along which the extraction gas 24 flows before being discharged. The annular gap 36 is smallest at the gas discharge port 26 where it may have a dimension (G) in a range from 200 μm to 300 μm, or about 250 μm. An outer diameter (d2) of the annular discharge port 26 may be in a range from 1 mm to 5 mm, and the extraction gas nozzle 28 may have a wall thickness in a range from 0.5 mm to 1.0 mm. The tip 20 of the printing nozzle 12 may protrude beyond the discharge port 26 by a distance (D1) in a range from 0.1 mm to 2.0 mm, or about 1 mm, so that the tip of the printing nozzle is closer to the substrate 16 than is the extraction gas nozzle. This can help prevent the extracted printing fluid from wetting or clogging other print head features, such as the gas discharge port 26.

With this configuration of nested nozzles, the extraction gas 24 thus flows from a pressure source (e.g., at an input pressure in a range from 1 psi to 30 psi), along the annular gap 36 between the outer surface 32 of the printing nozzle 12 and the inner surface 34 of the extraction gas nozzle 28, and is discharged through the annular gas discharge port 26. The discharged extraction gas then continues to flow along the outer surface 32 of the printing nozzle 12 and converges along the nozzle axis (A) after reaching the nozzle tip 20. The resulting low-pressure region 30 causes the printing fluid 14 in the nozzle 12 to be extracted. The fluid in the nozzle 12 may be pressurized as well, and fluid extraction may occur only when both printing nozzle pressure and extraction gas flow are present. Fluid extraction can thus be halted and reinitiated by respectively reducing and increasing printing nozzle pressure while the extraction gas continuously flows, or vice versa. As illustrated in FIG. 1, the extracted printing fluid 14' may expand and thereby be atomized to form an aerosol comprising the extraction gas and dispersed droplets of the printing fluid. The aerosol is thus formed outside the printing nozzle 12, while the printing fluid 14 contained in the printing nozzle is in bulk liquid form.

The illustrated print head 10 is also configured to provide an electrostatic field between the print head and the substrate 16. In this example, the extraction gas nozzle 28 is also an electrode to which a voltage (V) is applied to generate the electrostatic field. The electrostatic field can effectively focus the atomized printing fluid 14' before it reaches the substrate 16. This effective focusing occurs by accelerating the droplets of printing fluid 14' traveling in the aerosol so that they reach the substrate 16 faster than they otherwise would without the electrostatic field. An unfocused cone 38 of extracted printing fluid is illustrated schematically in FIG. 1 by a dotted line representing the shape of the stream of aerosol in the absence of the electrostatic field. The presence of the electrostatic field and the resulting acceleration of the droplets of printing fluid produces a narrower cone having a width (W) where it reaches the substrate. In other words, the degree of divergence of the droplets of extracted printing fluid 14' is reduced over a distance (D2) by shortening the time it takes each droplet to reach the substrate. The distance (D2) between the nozzle tip 20 and the substrate may be in a range from 3 mm to 30 mm, and the resulting width (W) of the deposited fluid may be in a range from 0.8 mm to 3 mm.

To function as an electrode that produces an electrostatic field, the extraction gas nozzle 28 may be formed from an electrically conductive material (e.g., a metal) or from some other material coated or plated with an electrically conductive material. Additionally, the printing nozzle 12 may be formed from or coated with an electrically insulating material (e.g., a polymer or ceramic) to prevent arcing within the print head 10. In this case, the above-described and illustrated extension of the tip 20 of the printing nozzle 12 beyond the gas discharge port 26 by some distance (D1) is additionally useful when the printing fluid 14 is electrically conductive so that sufficient distance is maintained between the extracted printing fluid and the conductive extraction gas nozzle to prevent possible arcing or attraction of the extracted fluid to the extraction gas nozzle.

When the applied voltage (V) is sufficiently high, there is no need to directly ground or electrically connect the substrate to an oppositely charged electrode of the voltage supply to generate an electric field between the electrode and substrate that is strong enough to affect the speed of travel of the atomized printing fluid 14'. For example, the voltage (V) may be on the order of thousands of volts (e.g., 2000-5000 V). With the extraction gas nozzle 28 charged to such a high degree and sufficiently close to the substrate 16 for purposes of printing, the material at the surface of the substrate and in the vicinity of the high voltage feature (i.e., beneath the nozzles 12, 28) behaves like a region with a lower electrical potential than that of the charged nozzle 28, resulting in an electrostatic field that is strong enough to draw the already atomized droplets of printing fluid toward the substrate.

While the exact mechanism of the electrical attraction between the substrate 16 and the atomized printing fluid is not fully understood, it is believed to be related to surface polarization effects at the substrate when in the presence of a highly charged electrode. In any case, the effect of a high voltage electrode over the stream of atomized printing fluid and an ungrounded substrate has been observed in practice. In particular, a print head constructed in a manner consistent with FIG. 1 has been used to print a printing fluid on substrates that are not electrically conductive and therefore cannot be grounded during printing. The resulting lines of printed fluid are consistent and controllable. When the charged electrode or nozzle is omitted, for example if the extraction gas nozzle is non-conductive or is not charged, the resulting lines of printing are less focused as with the unfocused cone 38.

The above-described printing process is a continuous one, as distinguished from drop-on-demand printing processes such as inkjet printing or e-jet printing, which generally discharge their respective inks from nozzles as individual droplets via correspondingly individual pressure pulses or electrical pulses. The electrostatic field may therefore also be continuously present, as the extraction of the printing fluid from the printing nozzle does not depend on the presence of the field. The electrode that generates the electrostatic field may take some form other than the extraction gas nozzle. In some cases, the applied electric charge may be alternating between positive and negative in a waveform. Some substrate materials (e.g., polypropylene, latex, and other types of polymers) tend to accumulate static electrical charges at their surfaces and may need to be neutralized prior to being printed on, such as by spraying the deposition surface with an anti-electrostatic fluid before printing.

An unexpected benefit of the above-described print head 10 is the capability of pure electrohydrodynamic printing, in which the extraction gas is turned off and the printing fluid 14 is extracted from the nozzle 12 by the electrostatic field generated between the high-voltage extraction gas nozzle and the substrate 16. To use the print head 10 as an e-jet print head, the distance (D2) of the nozzle tip 20 to the substrate must be at the lower end of the range used for aerosol printing, or lower. A tip-to-substrate distance (D2) in a range from 1 to 7 millimeters, or from 2 to 3 millimeters, is suitable for use of the print head 10 as an e-jet print head. While conventional e-jet printing is a drop-on-demand process, e-jet printing with the print head described herein may be effectively continuous, particularly when used with high viscosity printing fluids. At sufficiently high printing fluid viscosities, such as those with which conventional aerosol printing is not possible, the cohesiveness of the printing fluid may prevent the fluid from breaking into individually extracted droplets, even when the applied voltage is a pulsed or waveform voltage. Nonetheless, some of the benefits of the higher printing resolution associated with e-jet printing can be obtained.

The print head 10 is thus capable of three distinct printing modes, including an aerosol mode, an e-jet mode, and an e-assisted aerosol mode, and the printer equipped with the print head can be configured to easily change from one mode to another. For example, when a user requires relatively high-speed printing of a high viscosity fluid without a need for high resolution, the extraction gas 24 is turned on and the voltage (V) is turned off to print in aerosol mode. This mode produces a relatively unfocused aerosol cone 38 and is useful at a nozzle-to-substrate distance (D2) from about 10 mm to about 30 mm and can produce a line of printing having a width (W) from about 3 mm to about 5 mm. The aerosol mode can cover more substrate area in less time than the other two modes but is not capable of printing sub-millimeter features or details.

When higher resolution aerosol printing is desired, both the extraction gas 24 and the voltage (V) are turned on to print in e-assisted aerosol mode. This mode produces the more focused aerosol cone of atomized printing fluid 14' indicated in FIG. 1 with a width (W) of 3 mm or less, down to about 0.8 mm, with the nozzle tip 20 at the same distance (D2) as in aerosol mode. The e-assisted aerosol mode is thus capable of higher resolution printing than the aerosol mode but cannot cover as much substrate area per unit time.

When high-resolution printing is necessary, the extraction gas 24 is turned off and the voltage (V) is turned on to print in e-jet mode. This mode produces a precise line of printed material and is useful at a nozzle-to-substrate distance (D2) from about 1 mm to about 7 mm and can produce a line of printing having a width from about 200 μm to about 800 μm, depending in part on the viscosity of the printing fluid. The e-jet mode can thus print with a much higher resolution that the other two modes, but at a much slower rate of deposition. In addition to enabling the printing of high-viscosity specialty printing fluids, the disclosed print head 10 enables printing with multiple resolutions, eliminating the need for dedicated print heads for printing in different resolutions.

Figure 2:
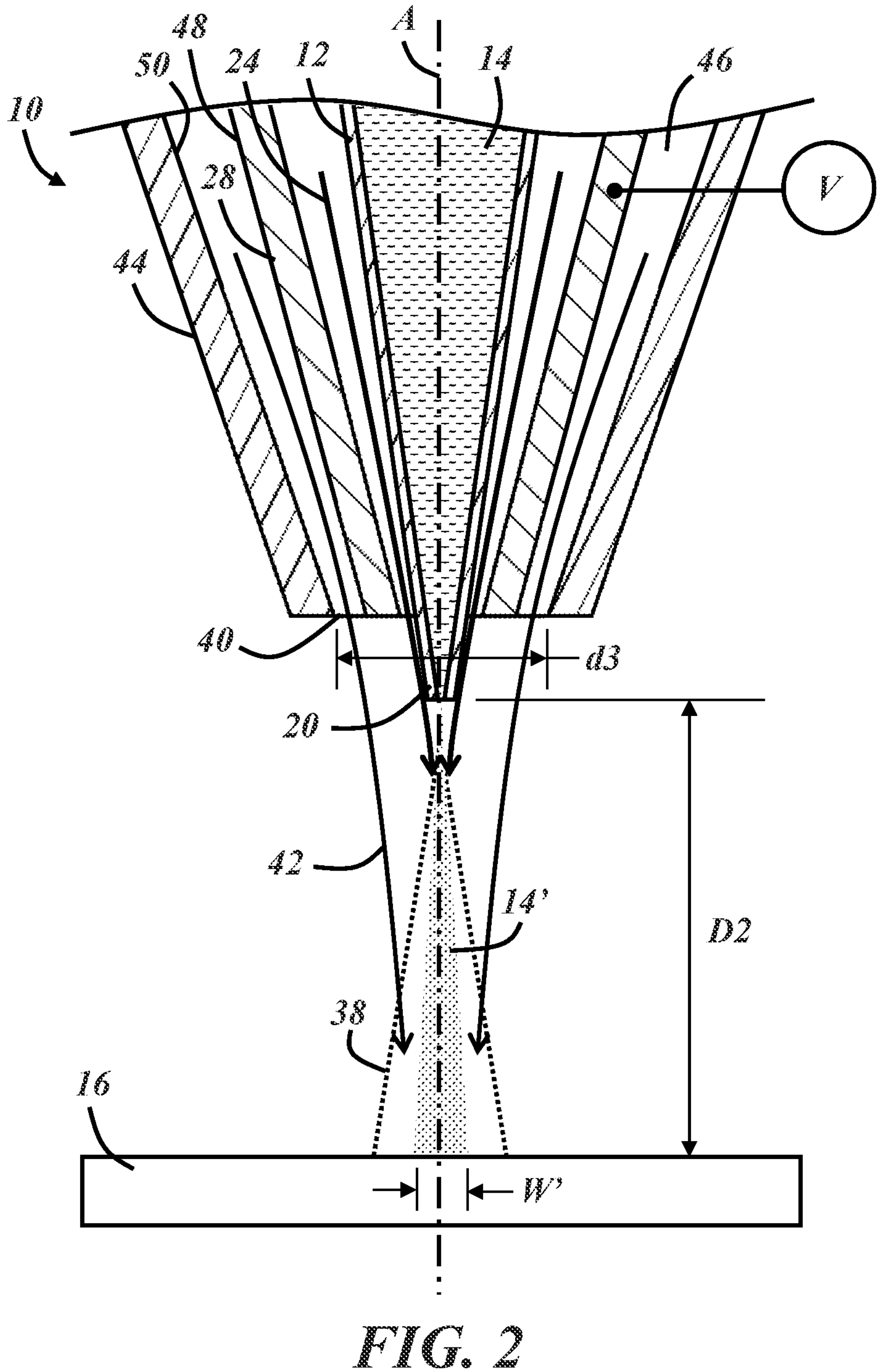
FIG. 2 is a cross-sectional view of the printing device equipped with an additional nozzle for providing a shroud of focusing gas.

With reference to FIG. 2, the above-described print head 10 is illustrated to additionally include a second gas discharge port 40 configured to provide a shroud of focusing gas 42 around the extracted printing fluid 14' between the print head and the substrate 16. The focusing gas 42 can further narrow the aerosol cone such that the width (W') of the printed fluid is less than the corresponding width (W) in the example of FIG. 1 at the same distance (D2) from nozzle tip 20 to substrate 16. The focusing gas 42 can have a composition that is the same as or different from that of the extraction gas 24 and may be discharged at a velocity that is the same as or different from that of the extraction gas.

In this example, the discharge port 40 is provided at the end of a focusing gas nozzle 44 that is coaxial with and surrounds the extraction gas nozzle 28 such that the focusing gas 42 flows along an annular gap 46 defined between an outer surface 48 of the extraction gas nozzle 28 and an inner surface 50 of the focusing gas nozzle 44 before being discharged to provide the shroud of focusing gas around the extracted printing fluid 14'. The focusing gas discharge port 40 may have a diameter (d3) in a range from 3 mm and 8 mm, and the annular gap defined between the extraction gas nozzle 28 and the focusing gas nozzle may be in a range from 0.5 mm and 1.5 mm, or about 1 mm. The focusing gas nozzle 44 may be formed from an electrically insulating material to avoid any possible arcing with the conductive extraction gas nozzle and may have a wall thickness in a range between 0.5 mm and 1.5 mm, or about 1 mm.

It is to be understood that the foregoing description is of one or more embodiments of the invention. The invention is not limited to the particular embodiment(s) disclosed herein, but rather is defined solely by the claims below. Furthermore, the statements contained in the foregoing description relate to the disclosed embodiment(s) and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Further, the term "electrically connected" and the variations thereof is intended to encompass both wireless electrical connections and electrical connections made via one or more wires, cables, or conductors (wired connections). Other terms are to be construed using their broadest reasonable meaning unless they are used in a context that requires a different interpretation.

The invention claimed is:

1. A printer, comprising:

a print head including a printing nozzle, an extraction gas nozzle, and an electrode, the printer being configured to selectively generate an electric field between the electrode and a substrate and to selectively discharge an extraction gas from the extraction gas nozzle such that the extraction gas flows along a tip of the printing nozzle, wherein the printer is operable to deposit printing fluid extracted from the printing nozzle onto the substrate in:

a gas-extraction mode, in which no voltage is supplied to the electrode so that the electric field is not generated and the extraction gas is pressurized in the extraction gas nozzle and discharged from the extraction gas nozzle to extract the printing fluid from the printing nozzle;

an e-jet mode, in which the extraction gas is not discharged from the extraction gas nozzle and a voltage is supplied to the electrode so that the electric field is generated to extract the printing fluid from the printing nozzle; and an e-assisted mode, in which the extraction gas is pressurized in the extraction gas nozzle and discharged from the extraction gas nozzle and a voltage is supplied to the electrode so that the electric field is generated and the printing fluid is extracted from the printing nozzle.

2. The printer of claim 1, wherein the electrode circumscribes the printing nozzle.

3. The printer of claim 1, wherein the extraction gas nozzle comprises the electrode.

4. The printer of claim 1, wherein the extraction gas nozzle is coaxial with the printing nozzle.

5. The printer of claim 1, wherein the extraction gas flows along a gap between the printing nozzle and the extraction gas nozzle before flowing along the tip of the printing nozzle in the gas-extraction mode and the e-assisted mode.

6. The printer of claim 1, wherein the extraction gas nozzle circumscribes the printing nozzle such that the extraction gas flows along an annular gap at an outer surface of the printing nozzle before being discharged from the extraction gas nozzle and converging at the tip of the printing nozzle in the gas-extraction mode and the e-assisted mode.

7. The printer of claim 1, wherein the tip of the printing nozzle is outside of the extraction gas nozzle.

8. The printer of claim 1, wherein the printer is changeable between the gas-extraction mode and the e-assisted mode by switching an electrode voltage respectively off and on.

9. The printer of claim 1, wherein the tip of the printing nozzle is located between the extraction gas nozzle and the substrate.

10. The printer of claim 1, further comprising a focusing nozzle that is coaxial with and surrounds the extraction gas nozzle such that a focusing gas flows along an annular gap at an outer surface of the extraction gas nozzle before being discharged from the focusing nozzle to provide a shroud of focusing gas around the extracted printing fluid between the printing nozzle and the substrate.

11. A printer, comprising:

a printing nozzle having a tip and being configured to supply uncharged printing fluid in bulk liquid form at the tip for extraction from the nozzle by an extraction gas; and an extraction gas nozzle configured to discharge a stream of the extraction gas toward a substrate with the tip of the nozzle in the stream of extraction gas, a velocity of the extraction gas being sufficient to continuously extract the printing fluid from the printing nozzle and carry the extracted printing fluid to the substrate, wherein the tip of the printing nozzle is located between the extraction gas nozzle and the substrate.

12. The printer of claim 11, further comprising an electrode configured to provide an electric field between the electrode and the substrate such that the printing fluid accelerates toward the substrate after extraction from the printing nozzle.

13. The printer of claim 12, wherein the electrode circumscribes the printing nozzle.

14. The printer of claim 12, wherein the extraction gas nozzle includes the electrode.

15. The printer of claim 11, wherein the printing fluid is pressurized in the printing nozzle and the printing fluid has a composition that prevents the printing fluid from being forced out of the tip of the nozzle in the absence of the stream of extraction gas.

16. The printer of claim 11, further comprising a focusing nozzle configured to provide a shroud of focusing gas around the extracted printing fluid between the printing nozzle and the substrate.

17. A printer comprising a print head, the print head comprising:

a printing nozzle having a tip and being configured to supply a printing fluid at the tip for extraction from the printing nozzle;

an extraction gas nozzle comprising a gas discharge port configured to discharge a stream of extraction gas along an outer surface of the printing nozzle and toward a substrate, wherein the tip of the printing nozzle is axially spaced from the gas discharge port and located in the stream of extraction gas between the gas discharge port and the substrate, a velocity of the extraction gas being sufficient to continuously extract printing fluid from the printing nozzle and carry the extracted printing fluid to the substrate; and an electrode configured to provide an electric field between the electrode and the substrate with the tip of the printing nozzle in the electric field such that the printing fluid accelerates toward the substrate after extraction from the printing nozzle, wherein the electrode circumscribes the printing nozzle, and wherein the extraction gas nozzle comprises the electrode.

18. The printer of claim 17, wherein the extraction gas nozzle is coaxial with the printing nozzle.

19. The printer of claim 17, further comprising a focusing nozzle that is coaxial with and surrounds the extraction gas nozzle such that a focusing gas flows along an annular gap at an outer surface of the extraction gas nozzle before being discharged from the focusing nozzle to provide a shroud of focusing gas around the extracted printing fluid between the printing nozzle and the substrate.

* * * * *